US010368298B2

(12) United States Patent
Cariou et al.

(10) Patent No.: US 10,368,298 B2
(45) Date of Patent: Jul. 30, 2019

(54) TRANSFER OF AGREEMENTS BETWEEN WIRELESS ACCESS POINTS

(71) Applicant: Intel IP Corporation, Santa Clara, CA (US)

(72) Inventors: Laurent Cariou, Portland, OR (US); Yaron Alpert, Hod Hasharoni (IL)

(73) Assignee: Intel IP Corporation, Santa Clara, CA (US)

( * ) Notice: Subject to any disclaimer, the term of this patent is extended or adjusted under 35 U.S.C. 154(b) by 429 days.

(21) Appl. No.: 15/198,322

(22) Filed: Jun. 30, 2016

(65) Prior Publication Data

US 2017/0245203 A1 Aug. 24, 2017

Related U.S. Application Data

(60) Provisional application No. 62/296,696, filed on Feb. 18, 2016.

(51) Int. Cl.
H04W 48/14 (2009.01)
H04W 28/02 (2009.01)
H04W 52/02 (2009.01)
H04W 60/04 (2009.01)
H04W 84/12 (2009.01)

(52) U.S. Cl.
CPC ....... H04W 48/14 (2013.01); H04W 52/0212 (2013.01); H04W 60/04 (2013.01); H04W 28/0268 (2013.01); H04W 84/12 (2013.01); Y02D 70/1242 (2018.01); Y02D 70/1262 (2018.01); Y02D 70/142 (2018.01); Y02D 70/144 (2018.01); Y02D 70/146 (2018.01); Y02D 70/164 (2018.01); Y02D 70/166 (2018.01); Y02D 70/22 (2018.01)

(58) Field of Classification Search
CPC .......................................... H04W 28/16–28/22
See application file for complete search history.

(56) References Cited

U.S. PATENT DOCUMENTS

| 2015/0282053 | A1* | 10/2015 | Kneckt | H04W 48/16 |
| | | | | 370/329 |
| 2016/0380727 | A1* | 12/2016 | Ryu | H04L 1/18 |
| | | | | 370/245 |
| 2016/0381716 | A1* | 12/2016 | Venkatesan | H04W 76/40 |
| | | | | 370/328 |
| 2017/0064695 | A1* | 3/2017 | Zhou | H04L 1/0036 |
| 2017/0078003 | A1* | 3/2017 | Ghosh | H04W 74/04 |
| 2018/0132175 | A1* | 5/2018 | Choi | H04W 52/02 |
| 2018/0368079 | A1* | 12/2018 | Wang | H04W 52/34 |

* cited by examiner

Primary Examiner — Marcus Smith
(74) Attorney, Agent, or Firm — Schwegman Lundberg & Woessner, P.A.

(57) ABSTRACT

Described herein are methods and devices in which agreements between a wireless station and an access point are transferred from one access point to another during a basic service set transition within an extended service set. The described techniques define methods for reducing the frame exchanges needed after association to negotiate certain parameters such as block acknowledgement agreements.

25 Claims, 7 Drawing Sheets

| BA AGREEMENTS UNCHANGED | BA AGREEMENTS PRESENT | TOTAL BA AGREEMENTS DESCRIPTION |
|---|---|---|
| | | |

*Fig. 3*

| BA PARAMETER SET FIXED | BA TIMEOUT VALUE FIXED | BA STARTING SEQUENCE CONTROL |
|---|---|---|
| | | |

*Fig. 4*

| B0 | B1 | B2  B5 | B6  B15 |
|---|---|---|---|
| A-MSDU SUPPORTED | BLOCK ACK POLICY | TID | BUFFER SIZE |

BITS:　　1　　　　1　　　　4　　　　10

TRANSFER OF AGREEMENTS BETWEEN WIRELESS ACCESS POINTS

PRIORITY CLAIM

This application claims priority to U.S. Provisional Patent Application Ser. No. 62/296,696 filed Feb. 18, 2016, which is incorporated herein by reference in their entirety

TECHNICAL FIELD

Embodiments described herein relate generally to wireless networks and communications systems.

BACKGROUND

Wireless networks as defined by the IEEE 802.11 specifications usually involve wireless stations associating with another station operating as an access point that coordinates communications between the stations and with other networks. Pre-association exchange sequences between stations occupy a very large proportion of airtime in dense environments. Reducing the amount of these exchanges and their size would be very helpful in increasing the efficiency of the network in dense environments.

BRIEF DESCRIPTION OF THE DRAWINGS

FIG. 3 shows an example of an agreement element for BA agreements according to some embodiments.

FIG. 4 shows an example of a BA agreement description field according to some embodiments.

FIG. 5 shows the subfields of the BA parameter set fixed field according to some embodiments.

DETAILED DESCRIPTION

Figure 1:
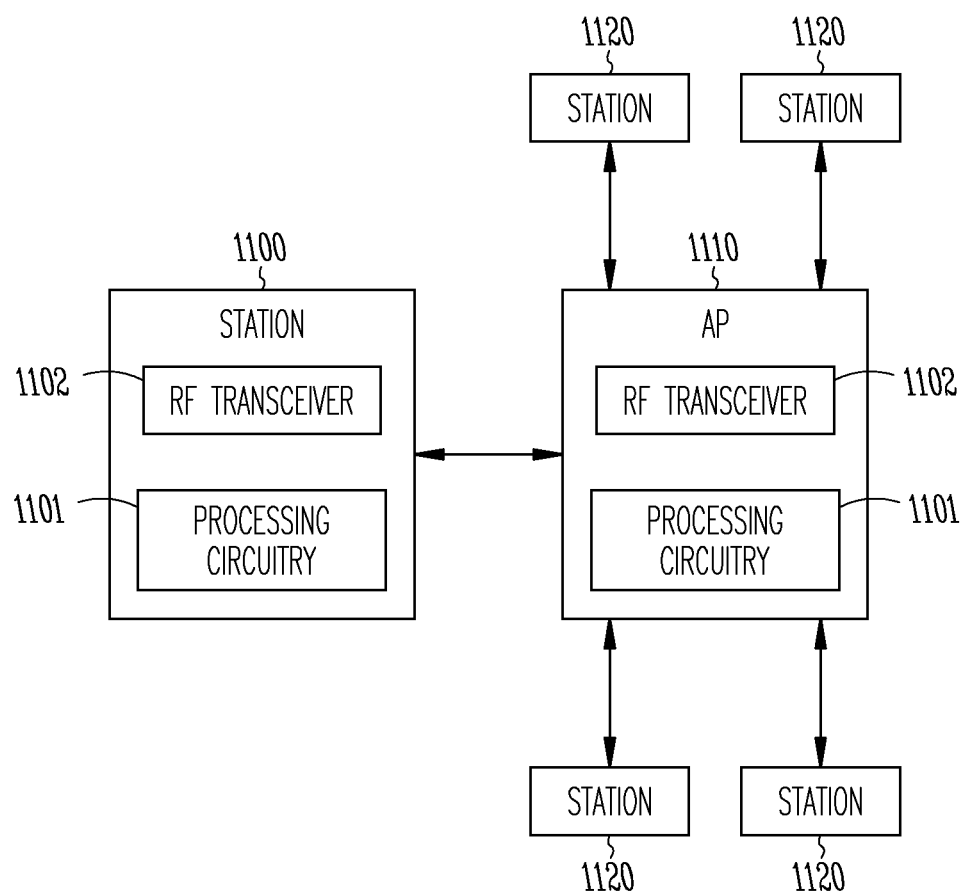
FIG. 1 illustrates a basic service set that includes a station device associated with an access point according to some embodiments.

In an 802.11 local area network (LAN), the entities that wirelessly communicate are referred to as stations (STAs). A basic service set (BSS) refers to a plurality of stations that remain within a certain coverage area and form some sort of association. A BSS is identified by the SSID of the BSS. In one form of association, the stations communicate directly with one another in an ad-hoc network. More typically, however, the stations associate with a central station dedicated to managing the BSS and referred to as an access point (AP). FIG. 1 illustrates a BSS that includes a station device 1100 associated with an access point (AP) 1110, where the AP 1110 may be associated with a number of other stations 1120. The device 1100 may be any type of device with functionality for connecting to a WiFi network such as a computer, smart phone, or a UE (user equipment) with WLAN access capability, the latter referring to terminals in a LTE (Long Term Evolution) network. Each of the station devices include an RF (radio frequency transceiver) 1102 and processing circuitry 1101 as shown by the depictions of devices 1100 and 1110. The processing circuitry includes the functionalities for WiFi network access via the RF transceiver as well as functionalities for processing as described herein. The RF transceivers of the station device 1100 and access point 1110 may each incorporate one or more antennas. The RF transceiver 1100 with multiple antennas and processing circuitry 101 may implement one or more MIMO (multi-input multi-output) techniques such as spatial multiplexing, transmit/receive diversity, and beam forming. The devices 1100 and 1110 are representative of the wireless access points and stations described below.

Figure 2:
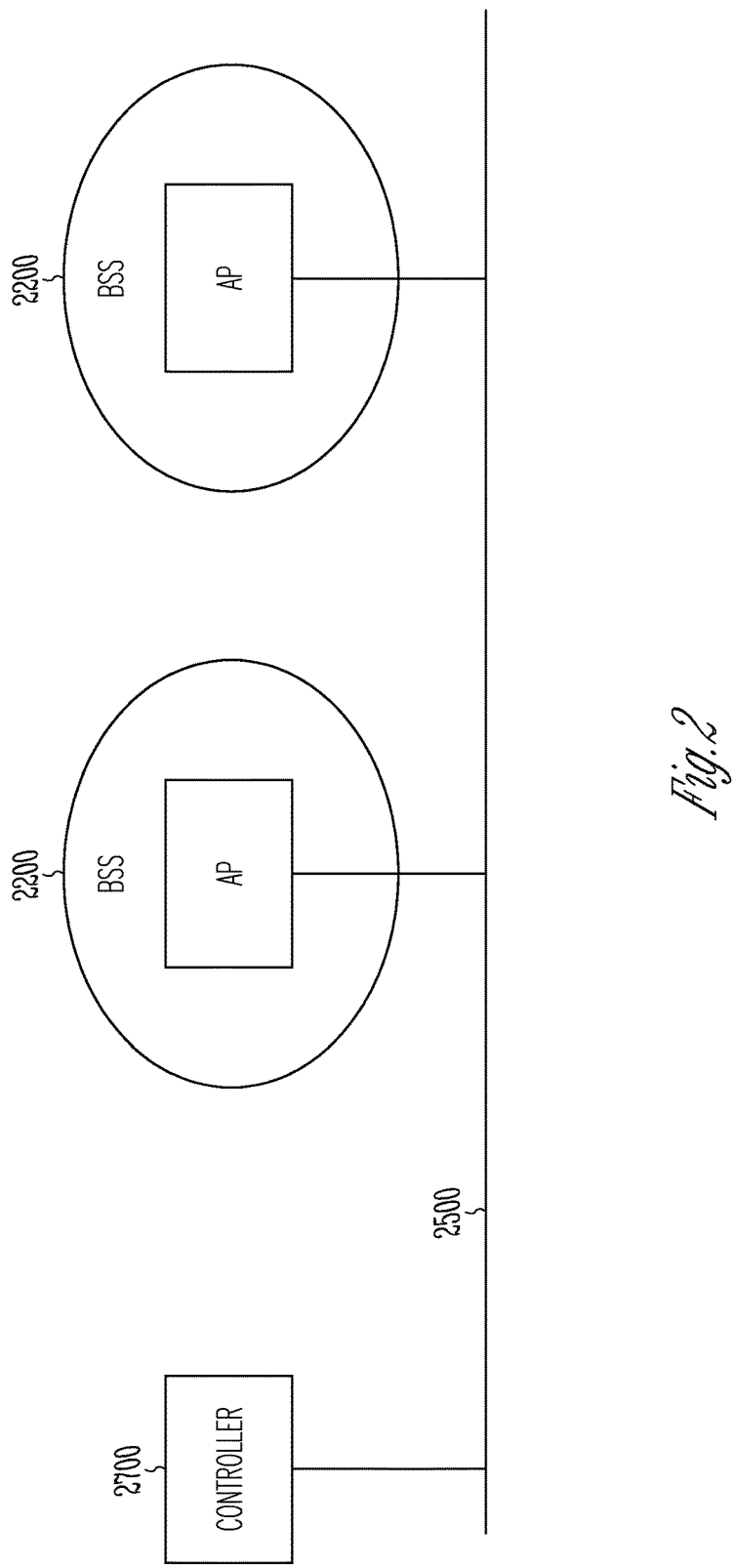
FIG. 2 illustrates an extended service set according to some embodiments.

As shown in FIG. 2, multiple infrastructure BSSs 2200 may be interconnected via their APs through a distribution system (DS) 2500 to form an extended service set (ESS). The ESS includes a controller 2700 for managing the APs of the different BSSs. The ESS is an 802.11 concept and does not dictate any particular type DS. Typically, however, the DS is an Ethernet (802.3) LAN.

In an 802.11 WLAN network, the stations communicate via a layered protocol that includes a physical layer (PHY) and a medium access control (MAC) layer. The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. Data frames carry data from station to station. Control frames, such as request-to-send (RTS), clear-to-send (CTS), and acknowledgement (ACK) frames are used in conjunction with data frames to deliver data reliably from station to station. Management frames are used to perform network management functions. Management frames include probe request frames sent by a station probing for the existence of a nearby AP and probe response frames sent by an AP in response to a probe request frame, association frames, and reassociation frames.

The block acknowledgement (BA) protocol improves efficiency by allowing for the transfer of a block of data frames that are acknowledged with a single BA frame instead of an ACK frame for each of the individual data frames. Block acknowledgement involves setup and teardown phases. In the setup phase, capability information such as buffer size and BA policy are negotiated between the transmitter and the receiver, and ADDBA (add block agreement) request and responses frames are interchanged. Once the setup phase completed, the transmitter can send frames without waiting for ACK frames. Finally the BA agreement is torn down with a so-called DELBA (delete block agreement) frame.

As described above, the different APs of an ESS are managed by a controller. The context information from each STA connected to one AP of the ESS is usually kept, or can be kept, in the controller. Usually, most of the APs are similar and have the same capabilities. Currently, even for a transition between different BSSs from the same ESS, all agreements are cancelled and need to be renegotiated. For example, even within an ESS, the BA agreement has to be negotiated after association on each new BSS the STA associates with. In all scenarios where the different APs have the same capabilities, the agreements could be kept unchanged. Allowing this to take place through new elements in probe, association, and/or reassociation response frames can help reduce the overhead of these renegotiations to help improve the overall efficiency, especially in dense environments Described herein are techniques by which agreements between a STA and an AP are transferred from one AP to another during a BSS transition within an ESS. The techniques define methods for reducing the frame exchanges needed after association to negotiate certain parameters such as BA agreements, multi-band agreements, target wake time (TWT) agreements, and others. This applies mainly, but not exclusively, to BSS transitions between an old AP and a new AP from the same ESS, especially when the different APs are managed by the same controller and when most of the APs have the same capabilities.

Assume a STA is performing a BSS transition between an old AP and a new AP from the same ESS. In one embodiment, the new AP sends, in a probe response, and/or in a association/reassociation response, a BA agreement element that contains a simple indication that the BA agreement is the same as with the old AP, the description of the old BA agreement, or the description of the new BA agreement. In other embodiments, the concept is extended to any negotiations or agreements between a STA and an AP from an ESS. For example, this can be applied to agreements such as the following: multi-band agreements, GCR agreements, WNM sleep mode agreements, TWT agreements, power save mode agreements, QoS policy agreements, aggregation limitations agreements, intra-inter BSS thresholds agreements, NAV setting rules agreements, ROMI agreements, and STA operation mode agreements.

In one embodiment, an AP includes in its probe/association/reassociation responses, a new element, referred to herein as an agreement element, for one or multiple agreements. The agreement element contains an indication that the agreement is the same as with the old AP, the description of the old agreement which is then kept for the new AP, or the description of the new agreement. In one example, the agreement element is a global agreement element which contains a sub-element for each specific agreement (e.g., one for the BA agreement, one for TWT agreement, and so on). In another example, multiple agreement elements are used for each specific agreement.

In some embodiments, the AP can signal to the STA that a specific agreement needs to be renegotiated. Such signaling may be performed by the specific agreement element not being present, by the specific agreement sub-element not being present in a global agreement element, by the specific agreement element or the specific agreement sub-element in a global agreement element indicating that the agreement needs to be renegotiated. In some embodiments, the probe, association, and/or reassociation responses include the agreement proposition for the different agreements that need to be negotiated.

Figure 6:
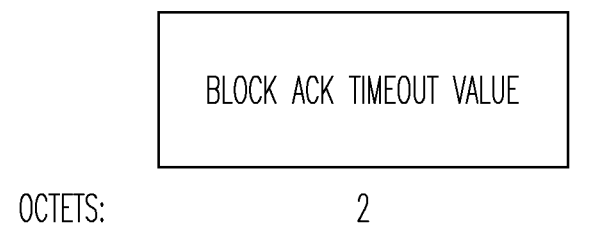
FIG. 6 shows the BA timeout value fixed field according to some embodiments.
Figure 7:
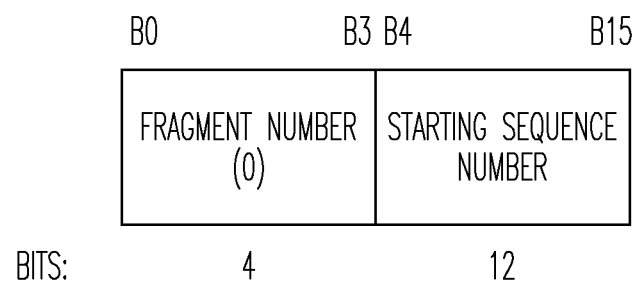
FIG. 7 shows the BA starting sequence control field according to some embodiments.

FIG. 3 shows an example of an agreement element for BA agreements that is made of three fields: a BA agreements unchanged field, a BA agreements present field, and a total BA agreements description field. The BA agreement unchanged field may be a one-bit field that, for example, is set to one to indicate the BA agreements are kept identical to the previous AP and set to zero to indicate that the BA agreements must be renegotiated. The BA agreements present field is set to the number of BA agreements included in the BA agreements description field. The total BA agreement description field is made up of a concatenation of multiple BA agreement descriptions. An example of a BA agreement description field is shown in FIG. 4 which includes a BA parameter set fixed field, a BA timeout value fixed field, and a BA starting sequence control field. FIG. 5 shows the subfields of the BA parameter set fixed field which include a one-bit A-MDSU supported subfield, a one-bit Block Ack policy subfield, a four-bit TID subfield, and a ten-bit Buffer Size subfield. FIG. 6 shows the BA timeout value fixed field as being made up of a single two-octet Block Ack Timeout Value subfield. FIG. 7 shows the BA starting sequence control field as being made up of a four-bit Fragment Number subfield and a twelve-bit Starting Sequence Number subfield.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
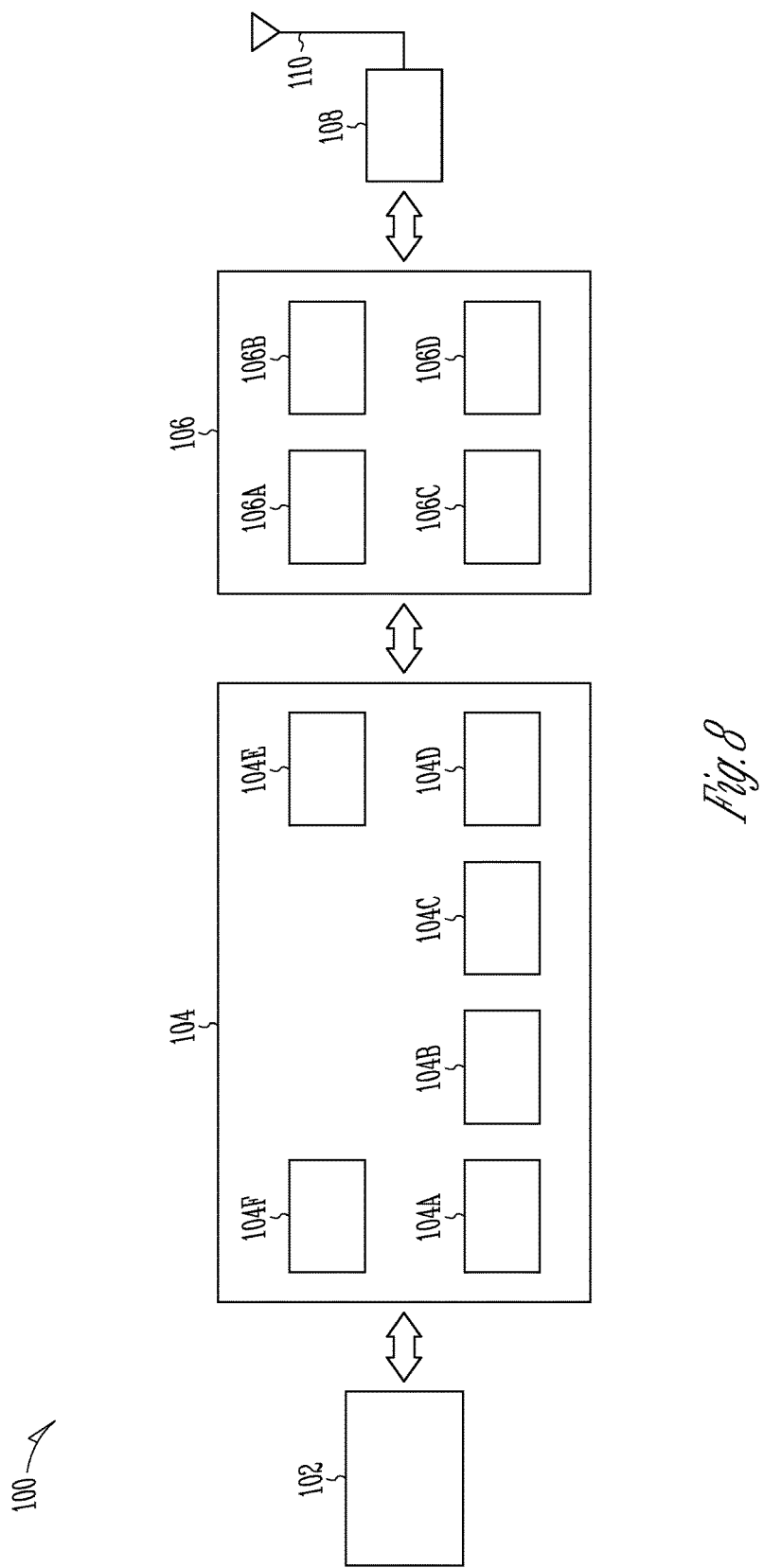
FIG. 8 illustrates an example of a user equipment device according to some embodiments.

Embodiments described herein may be implemented into a system using any suitably configured hardware and/or software. FIG. 8 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast- Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Example Machine Description

Figure 9:
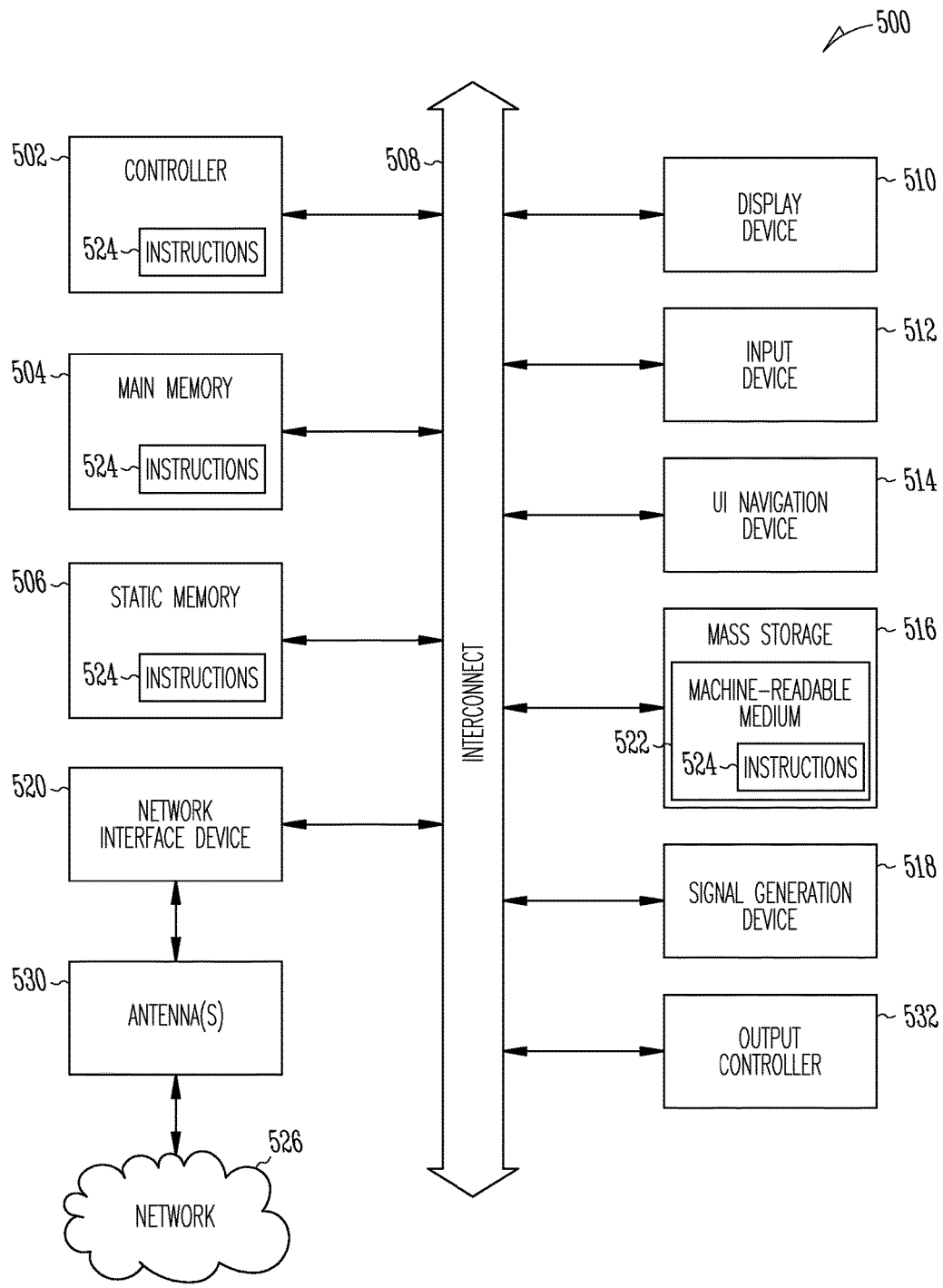
FIG. 9 illustrates an example of a computing machine according to some embodiments.

FIG. 9 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

Figure 10:
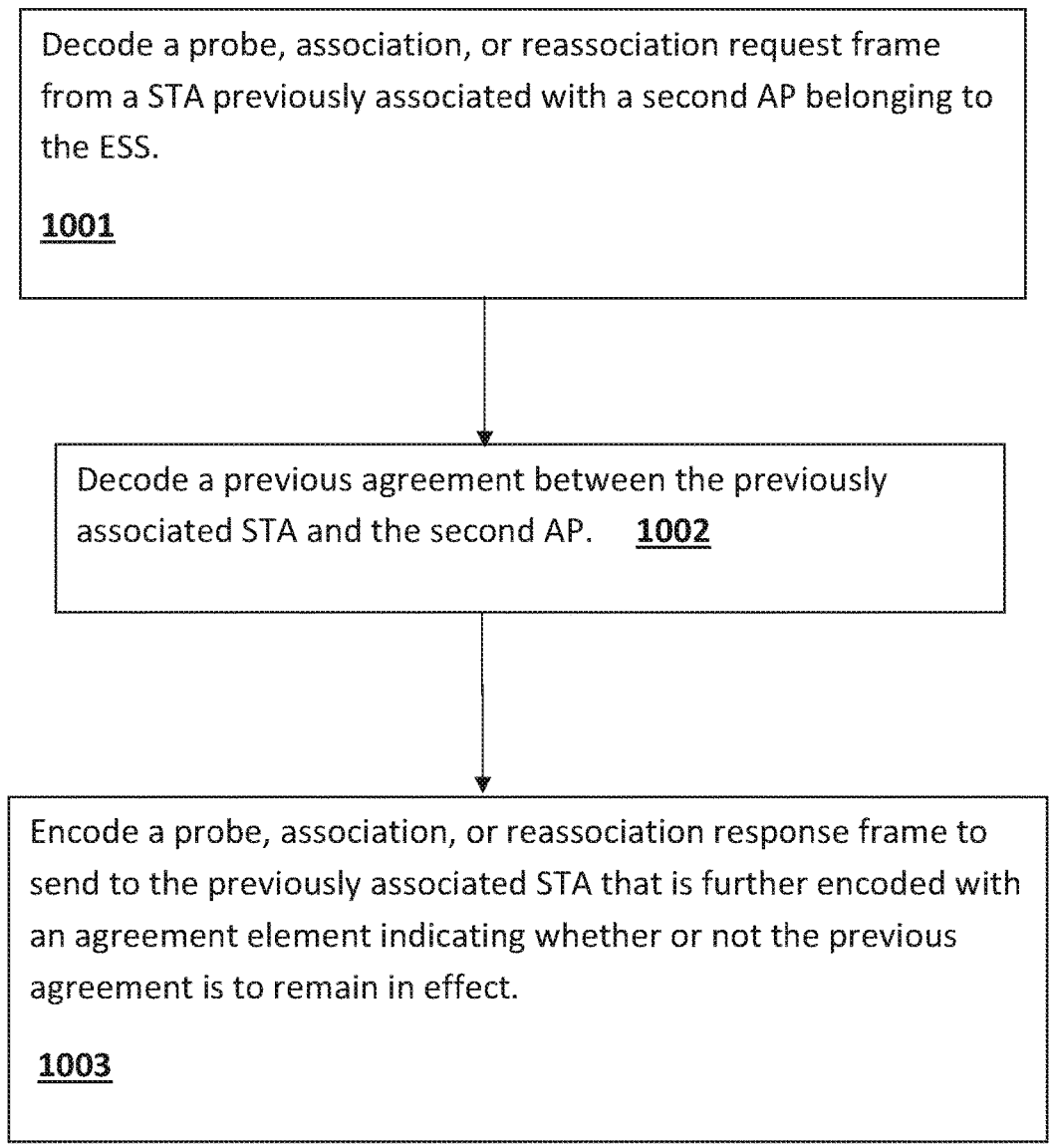
FIG. 10 illustrates operation of a wireless station device according to some embodiments.

FIG. 10 illustrates the operation of a wireless station device configured to communicate with other STAs as a first access point (AP) in an extended service set (ESS) according to some embodiments. At stage 1001, the device decodes a probe, association, or reassociation request frame from a STA previously associated with a second AP belonging to the ESS. At stage 1002, the device decodes a previous agreement between the previously associated STA and the second AP. At stage 1003, the device encodes a probe, association, or reassociation response frame to send to the previously associated STA that is further encoded with an agreement element indicating whether or not the previous agreement is to remain in effect.

In Example 1, an apparatus for a wireless station device comprises: memory and processing circuitry to configure the device to communicate with other station devices (STAs) in a wireless network as a first access point (AP) belonging to an extended service set (ESS); wherein the processing circuitry is to: decode a probe, association, or reassociation request frame from a STA previously associated with a second AP belonging to the ESS; decode a previous agreement between the previously associated STA and the second AP; and, encode a probe, association, or reassociation response frame to send to the previously associated STA that is further encoded with an agreement element indicating whether or not the previous agreement is to remain in effect.

In Example 2, the subject matter of any of the Examples herein may optionally include wherein the previous agreement is a block acknowledgement (BA) agreement, multi-band agreement, GCR agreement, WNM sleep mode agreement, TWT agreement, power save mode agreement, QoS policy agreement, aggregation limitation agreement, intra/inter BSS threshold agreement, NAV setting rules agreement, ROMI agreement, or STA operating mode agreement.

In Example 3, the subject matter of any of the Examples herein may optionally include wherein the processing circuitry is to encode a plurality of agreement elements each of which relates to a separate previous agreement between the previously associated STA and the second AP.

In Example 4, the subject matter of any of the Examples herein may optionally include wherein the processing circuitry is to encode an agreement element that is a global agreement element containing a plurality of sub-elements each of which relates to a separate previous agreement between the previously associated STA and the second AP.

In Example 5, the subject matter of any of the Examples herein may optionally include wherein the agreement element indicates that the previous agreement is to remain in effect by indicating that a new agreement with the previously associated STA is to be the same as the previous agreement or by including a description of the previous agreement that is to be maintained with the previously associated STA.

In Example 6, the subject matter of any of the Examples herein may optionally include wherein the agreement element indicates that the previous agreement is not to remain in effect by including a description of a new agreement with the previously associated STA.

In Example 7, the subject matter of any of the Examples herein may optionally include wherein the processing circuitry is to signal to the previously associated STA that a specific previous agreement needs to be renegotiated by omitting a specific agreement element or sub-element from the probe, association, or reassociation response frame.

In Example 8, the subject matter of any of the Examples herein may optionally include wherein the processing circuitry is to signal to the previously associated STA that a specific previous agreement needs to be renegotiated by including a renegotiation element that indicates the previous agreement needs to be re-negotiated.

In Example 9, the subject matter of any of the Examples herein may optionally include wherein the processing circuitry is to signal to the previously associated STA that a specific previous agreement needs to be renegotiated by including a renegotiation element that indicates the previous agreement needs to be re-negotiated and further including an agreement proposition to replace the previous agreement.

In Example 10, the subject matter of any of the Examples herein may optionally include wherein the agreement element comprises a first field that indicates whether one or more previous agreements are to remain in effect or need to be renegotiated, a second field that indicates the number of previous agreements, and a third field that contains a description of each previous agreement.

In Example 11, a computer-readable medium contains instructions to cause a wireless station device (STA), upon execution of the instructions by processing circuitry of the STA, to perform any of the functions of the processing circuitry as recited by any of the Examples herein.

In Example 12, a method for operating a wireless station comprises performing any of the functions of the processing circuitry as recited by any of the Examples herein The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks-Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, Mar. 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for a wireless station device, the apparatus comprising:
    memory and processing circuitry to configure the device to communicate with other station devices (STAs) in a wireless network as a first access point (AP) belonging to an extended service set (ESS);
    wherein the processing circuitry is to:
    decode a probe, association, or reassociation request frame from a STA previously associated with a second AP belonging to the ESS;
    decode a previous agreement between the previously associated STA and the second AP; and,
    encode a probe, association, or reassociation response frame to send to the previously associated STA that is further encoded with an agreement element indicating whether or not the previous agreement is to remain in effect.

2. The apparatus of claim 1 wherein the previous agreement is a block acknowledgement (BA) agreement, multi-band agreement, GCR agreement, WNM sleep mode agreement, TWT agreement, power save mode agreement, QoS policy agreement, aggregation limitation agreement, intra/inter BSS threshold agreement, NAV setting rules agreement, ROMI agreement, or STA operating mode agreement.

3. The apparatus of claim 1 wherein the processing circuitry is to encode a plurality of agreement elements each of which relates to a separate previous agreement between the previously associated STA and the second AP.

4. The apparatus of claim 1 wherein the processing circuitry is to encode an agreement element that is a global agreement element containing a plurality of sub-elements each of which relates to a separate previous agreement between the previously associated STA and the second AP.

5. The apparatus of claim 1 wherein the agreement element indicates that the previous agreement is to remain in effect by indicating that a new agreement with the previously associated STA is to be the same as the previous agreement or by including a description of the previous agreement that is to be maintained with the previously associated STA.

6. The apparatus of claim 1 wherein the agreement element indicates that the previous agreement is not to remain in effect by including a description of a new agreement with the previously associated STA.

7. The apparatus of claim 1 wherein the processing circuitry is to signal to the previously associated STA that a specific previous agreement needs to be renegotiated by omitting a specific agreement element or sub-element from the probe, association, or reassociation response frame.

8. The apparatus of claim 1 wherein the processing circuitry is to signal to the previously associated STA that a specific previous agreement needs to be renegotiated by including a renegotiation element that indicates the previous agreement needs to be re-negotiated.

9. The apparatus of claim 1 wherein the processing circuitry is to signal to the previously associated STA that a specific previous agreement needs to be renegotiated by including a renegotiation element that indicates the previous agreement needs to be re-negotiated and further including an agreement proposition to replace the previous agreement.

10. The apparatus of claim 1 wherein the agreement element comprises a first field that indicates whether one or more previous agreements are to remain in effect or need to be renegotiated, a second field that indicates the number of previous agreements, and a third field that contains a description of each previous agreement.

11. A method for operating a wireless station device, comprising:
    decoding a probe, association, or reassociation request frame from a STA previously associated with a second AP belonging to the ESS;
    decoding a previous agreement between the previously associated STA and the second AP; and,
    encoding a probe, association, or reassociation response frame to send to the previously associated STA that is further encoded with an agreement element indicating whether or not the previous agreement is to remain in effect.

12. The method of claim 11 wherein the previous agreement is a block acknowledgement (BA) agreement, multi-band agreement, GCR agreement, WNM sleep mode agreement, TWT agreement, power save mode agreement, QoS policy agreement, aggregation limitation agreement, intra/inter BSS threshold agreement, NAV setting rules agreement, ROMI agreement, or STA operating mode agreement.

13. The method of claim 11 further comprising encoding a plurality of agreement elements each of which relates to a separate previous agreement between the previously associated STA and the second AP.

14. The method of claim 11 further comprising encoding an agreement element that is a global agreement element containing a plurality of sub-elements each of which relates to a separate previous agreement between the previously associated STA and the second AP.

15. The method of claim 11 wherein the agreement element indicates that the previous agreement is to remain in effect by indicating that a new agreement with the previously associated STA is to be the same as the previous agreement or by including a description of the previous agreement that is to be maintained with the previously associated STA.

16. The method of claim 11 wherein the agreement element indicates that the previous agreement is not to remain in effect by including a description of a new agreement with the previously associated STA.

17. The method of claim 11 further comprising signaling to the previously associated STA that a specific previous agreement needs to be renegotiated by omitting a specific agreement element or sub-element from the probe, association, or reassociation response frame.

18. The method of claim 11 further comprising signaling to the previously associated STA that a specific previous agreement needs to be renegotiated by including a renegotiation element that indicates the previous agreement needs to be re-negotiated.

19. The method of claim 11 further comprising signaling to the previously associated STA that a specific previous agreement needs to be renegotiated by including a renegotiation element that indicates the previous agreement needs to be re-negotiated and further including an agreement proposition to replace the previous agreement.

20. The method of claim 11 wherein the agreement element comprises a first field that indicates whether one or more previous agreements are to remain in effect or need to be renegotiated, a second field that indicates the number of previous agreements, and a third field that contains a description of each previous agreement.

21. A non-transitory computer-readable medium comprising instructions to cause a wireless station device (STA), upon execution of the instructions by processing circuitry of the STA, to:
    decode a probe, association, or reassociation request frame from a STA previously associated with a second AP belonging to the ESS;
    decode a previous agreement between the previously associated STA and the second AP; and,
    encode a probe, association, or reassociation response frame to send to the previously associated STA that is further encoded with an agreement element indicating whether or not the previous agreement is to remain in effect.

22. The medium of claim 21 wherein the previous agreement is a block acknowledgement (BA) agreement, multi-band agreement, GCR agreement, WNM sleep mode agreement, TWT agreement, power save mode agreement, QoS policy agreement, aggregation limitation agreement, intra/inter BSS threshold agreement, NAV setting rules agreement, ROMI agreement, or STA operating mode agreement.

23. The medium of claim 21 further comprising instructions to encode a plurality of agreement elements each of which relates to a separate previous agreement between the previously associated STA and the second AP.

24. The medium of claim 21 further comprising instructions to encode an agreement element that is a global agreement element containing a plurality of sub-elements each of which relates to a separate previous agreement between the previously associated STA and the second AP.

25. The medium of claim 21 wherein the agreement element indicates that the previous agreement is to remain in effect by indicating that a new agreement with the previously associated STA is to be the same as the previous agreement or by including a description of the previous agreement that is to be maintained with the previously associated STA.

* * * * *